Jan. 5, 1943.   E. F. PAWSAT   2,307,235
BICYCLE STAND
Filed Feb. 8, 1940
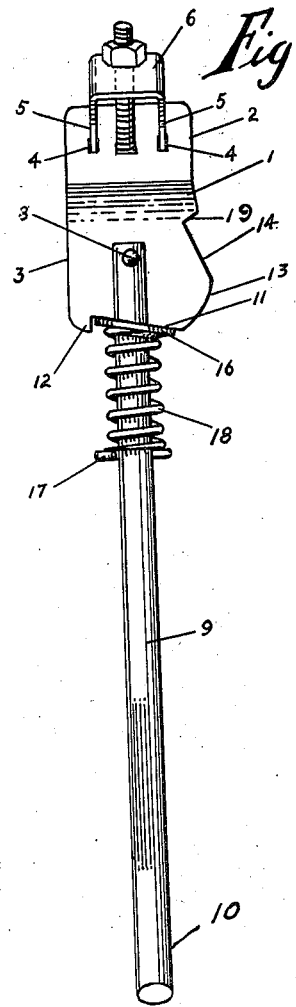
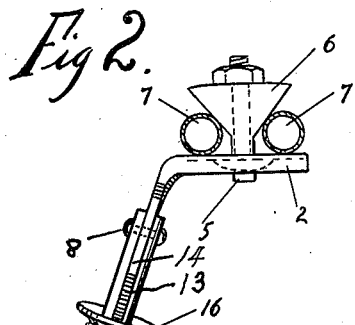
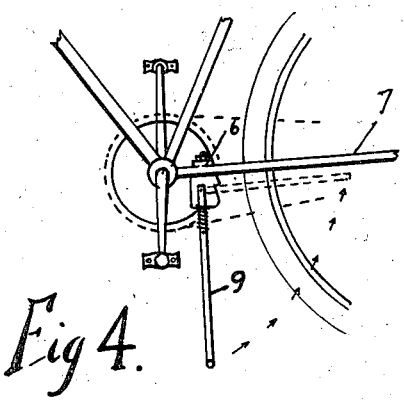
Inventor,
Ewald F. Pawsat,
By Arthur H. Ewald,
Attorney.

Patented Jan. 5, 1943

2,307,235

UNITED STATES PATENT OFFICE 2,307,235

BICYCLE STAND

Ewald F. Pawsat, Maysville, Ky.

Application February 8, 1940, Serial No. 317,881

3 Claims. (Cl. 280—301)

The present invention relates to a stand adapted to be secured to a bicycle or similar vehicle and to be used for supporting such vehicle in a standing position when the same is not in use.

The principal object of this invention is to provide a simple inexpensive and efficient stand which may be secured to a bicycle, or similar vehicle, said stand being provided with a supporting standard arranged to be placed either in a supporting position to sustain the bicycle when not in use or in a raised position wherein it does not interfere with the operation of the vehicle.

Other objects of the present invention will appear from the following detailed description thereof.

In the drawing:

Figure 1 is a side elevation of a bicycle stand constructed in accordance with this invention.

Figure 2 is a rear elevation of said stand.

Figure 3 is a sectional view of the clamping mechanism.

Figure 4 is an elevation, showing the attachment of this device to a bicycle.

The numeral 1 indicates a plate having a horizontal section 2 and an oblique outwardly and downwardly inclined section 3. The horizontal section 2 is slotted as shown at 4—4 to receive the fingers 5—5 of a clamping plate 6, said plate 6 being arranged to cooperate with the section 2 of plate 1 so as to secure the device to the rods 7—7 of the rear prong of a bicycle in back of the pedal hanger, such attachment being illustrated in Figure 4 of the drawing. When the device is so attached the fingers 5 of the plate 6 extend downwardly between rods 7, as clearly shown in Figure 2.

Pivotally secured at 8 on the section 3 of the plate 1, is the bifurcated end of a supporting standard 9, the lower end 10 of which is bent outwardly as shown in Figure 2. The lower edge of the section 3 of plate 1 is provided with a detent surface 11 which inclines upwardly and forwardly from the rear portion of said plate to a lug 12 at the front edge of the plate. The section 3 at the rear of said detent 11 is provided with a curved cam surface 13 which extends upwardly from the rear end of the detent surface and merges with the lower end of a detent surface 14 formed in the rear edge of the plate. The approximate median of the detent surface 11 is vertically below the pivotal connection 8, and the median point of the detent surface 14 is disposed in approximate horizontal alignment with said pivotal mounting. Mounted on the upper portion of the standard 9 between a washer 16 and a cotter pin 17, the washer being slidably disposed on the standard, is a compression spring 18. The upper surface of the washer 11 is adapted to abut against the edge of the section 3 of plate 1 and to be frictionally held in position by either the detent surface 11 or the surface 14. By this means the standard is held in its lower or bicycle supporting position by the abutment of the washer 16 against the detent surface 11. In such position the front edge of the washer abuts against the shoulder 12, preventing the standard from being moved forwardly by the tension of the spring cooperating with the upwardly and forwardly inclined detent surface. When desired, however, the standard may be moved backwardly, the washer riding against the compression of spring 18, along the detent surface 11 and over the cam surface 13 on to the detent surface 14, which diverges downwardly from the vertical axis of the pivotal connection of the standard with the plate. The detent surface 14, therefore, by reason of the frictional engagement of the washer 16, supports the standard in raised or horizontal position, in which position the bicycle may be operated in its usual manner. The upward movement of the standard is limited by a shoulder 19. To place the standard in supporting position, the reverse operation, of course, is required, the washer riding against the compression of spring 18 from the surface 14 over the cam surface 13 and on to the detent surface 11.

In Figure 4 I have shown the attachment of the device to a bicycle, the standard being shown in full lines in lower or supporting position and in broken lines in its raised or inoperative position.

In the drawing I have shown the washer 16 as of cupped formation and such construction is desirable although not essential. The mechanism for attachment to the vehicle as illustrated in the drawing and above described is also, of course, not essential in its details to the standard supporting and operating mechanism.

Having thus fully described my invention, what I claim as new and desire to secure by Letters Patent is:

1. In a bicycle stand the combination with a frame prong, of a plate adapted to be secured to said prong, a second plate projecting from the first plate and extending downwardly and outwardly with respect to the prong and first plate, a standard pivotally mounted on said second plate, said second plate being provided in its periphery with a flat detent surface extending at an acute angle to the vertical axis of the plate which axis passes through the center of the standard pivot, a second flat detent surface in the periphery of the second plate substantially 90° displaced from the first detent surface and extending at an acute angle to the horizontal axis of the plate and which axis passes through the center of the standard pivot, and an arcuate surface on the periphery of said second plate generated about the standard pivot and joining the first and second detent surfaces, and yieldable detent means on said standard including a surface substantially complementary to the flat detent surfaces for engagement therewith when the standard is in alignment with the vertical and horizontal axes of the plate whereby the standard is yieldably retained in said positions and requiring merely pressure on the standard in the direction of the unoccupied detent surface when desiring to shift the standard from one to the other position, and a lug at the remote ends of said detent surfaces for limiting the movement of the standard by engagement with the yieldable detent means.

2. In a bicycle stand the combination with a frame prong, of a plate adapted to be secured to said prong, a second plate projecting from the first plate and extending downwardly and outwardly with respect to the prong and first plate, a standard pivotally mounted on said second plate, said second plate being provided in its periphery with a flat detent surface extending at an acute angle to the vertical axis of the plate which axis passes through the center of the standard pivot, a second flat detent surface in the periphery of the second plate substantially 90° displaced from the first detent surface and extending at an acute angle to the horizontal axis of the plate and which axis passes through the center of the standard pivot, and an arcuate surface on the periphery of said second plate generated about the standard pivot and joining the first and second detent surfaces, a cup shaped washer slidably and tiltably mounted on said standard, dished downwardly with respect to the second plate, whereby the upper edge of the washer rim engages the detent surfaces, and the inner portion of the washer engages the arcuate portion of the plate, and a spring on said standard fixed against independent longitudinal movement for yieldably holding the washer against the plate detent surfaces and connecting arcuate surface and permitting universal tilting thereof.

3. In a bicycle stand the combination with a frame prong, of a plate adapted to be secured to said prong, a second plate projecting from the first plate and extending downwardly and outwardly with respect to the prong and first plate, a standard pivotally mounted on said second plate, said second plate being provided in its periphery with a flat detent surface extending at an acute angle to the vertical axis of the plate which axis passes through the center of the standard pivot, a second flat detent surface in the periphery of the second plate substantially 90° displaced from the first detent surface and extending at an acute angle to the horizontal axis of the plate and which axis passes through the center of the standard pivot, and an arcuate surface on the periphery of said second plate generated about the standard pivot and joining the first and second detent surfaces, a cup shaped washer slidably and tiltably mounted on said standard, dished downwardly with respect to the second plate, whereby the upper edge of the washer rim engages the detent surfaces, and the inner portion of the washer engages the arcuate portion of the plate, and a spring on said standard fixed against independent longitudinal movement for yieldably holding the washer against the plate detent surfaces and connecting arcuate surface and permitting universal tilting thereof, and lugs on said plate at the remote ends of the detent surfaces for limiting the movement of the standard and accurately positioning the same, with respect to the inclined plate.

EWALD F. PAWSAT.